No. 860,244. PATENTED JULY 16, 1907.
J. T. H. PAUL.
FILTER.
APPLICATION FILED APR. 1, 1907.
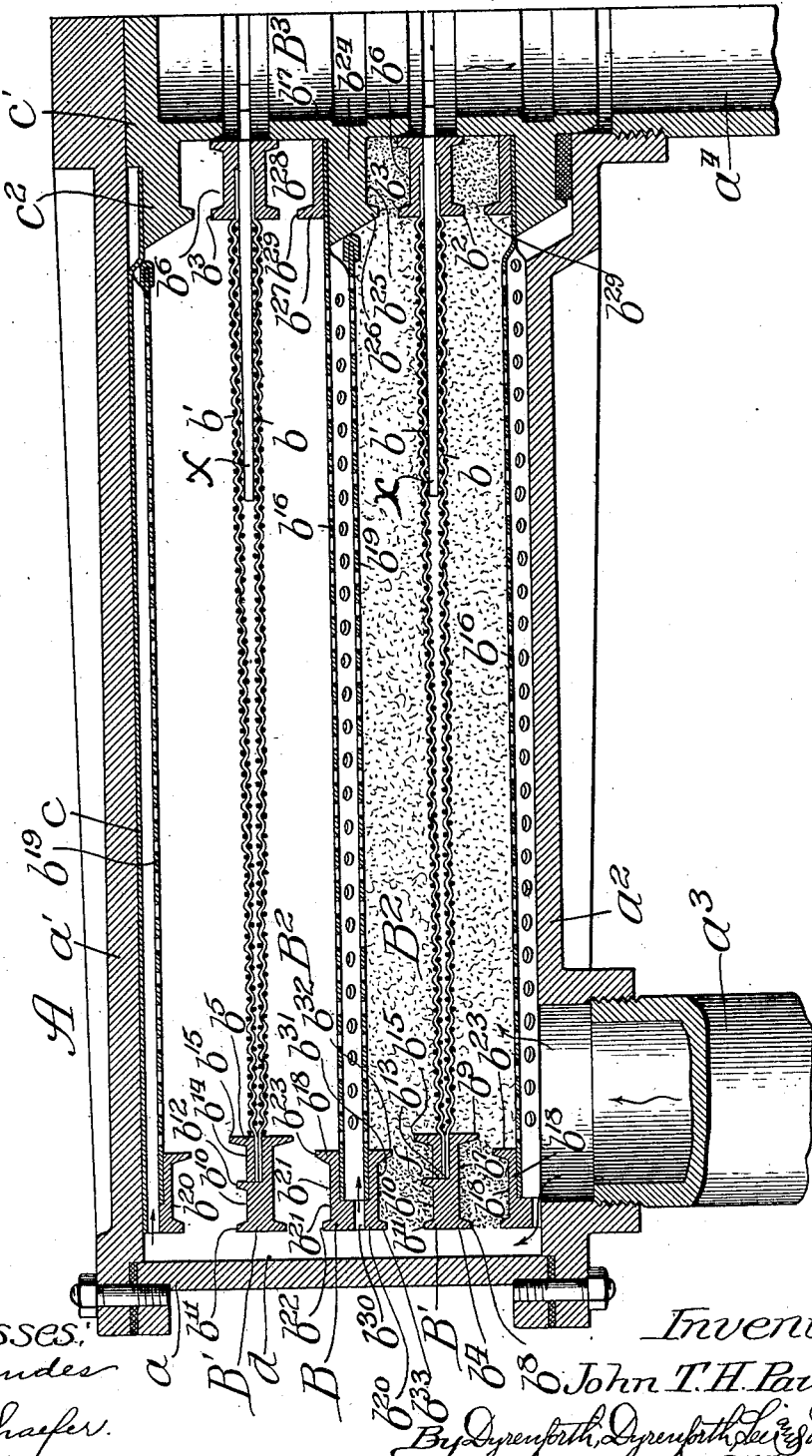

UNITED STATES PATENT OFFICE.

JOHN T. H. PAUL, OF CHICAGO, ILLINOIS, ASSIGNOR TO E. GOLDMAN & CO., OF CHICAGO, ILLINOIS, A CORPORATION OF ILLINOIS.

FILTER.

No. 860,244.   Specification of Letters Patent.   Patented July 16, 1907.

Application filed April 1, 1907. Serial No. 365,716.

*To all whom it may concern:*

Be it known that I, JOHN T. H. PAUL, a citizen of the United States, residing at Chicago, in the county of Cook and State of Illinois, have invented a new and useful Improvement in Filters, of which the following is a specification.

This invention relates particularly to filters for use in filtering liquors; and the primary object of the invention is to provide a filter of simple construction having a large capacity and having improved means for preventing any liquor from passing through the filter except through the proper channels of percolation.

The invention is illustrated in its preferred embodiment in the accompanying drawing, which represents a broken vertical sectional view of the improved filter.

The filter comprises, in its preferred embodiment, a casing A; distributer-elements, B; collector-elements, B'; filter-masses $B^2$ confined between the collector-elements and the distributer-elements; and a central outlet conduit, $B^3$, made up of conduit-sections, with which the collector and distributer-elements are equipped at their centers.

The casing A may be of any approved construction. As shown, it comprises a cylinder $a$ externally flanged at its ends; top and bottom ends $a^1$, $a^2$, respectively, detachably connected with the cylinder; an inlet conduit $a^3$ connected with the bottom $a^2$ near its periphery; and an outlet conduit $a^4$ connected with the bottom at its center and forming a continuation of the sectionally constructed conduit $B^3$ of the filter-cells.

The collector and distributer-elements of the filter alternate with each other and in connection with the filter-material, comprise the filter-cells through which the liquor must pass. Each collector-element comprises two annular screens $b$, $b^1$, equipped at their inner peripheral margins with packing rings $b^2$, $b^3$, respectively, and equipped at their outer peripheral margins with packing rings $b^4$, $b^5$, respectively. Spacing members $x$ are arranged between the screens and between the packing rings $b^2$, $b^3$, to provide passages leading to the central outlet conduit. The packing rings $b^2$, $b^3$, also form sections of the sectional outlet conduit $B^3$. The rings $b^2$, $b^3$, are provided on their non-adjacent faces with grooves $b^6$, thus making the rings of channel-form cross-section.

The packing ring $b^4$ affords a binding member for the outer periphery of the screen $b$, and is attached to the outer periphery of said screen in any suitable manner, as by soldering. The packing ring $b^4$ is provided on its lower surface with an annular channel $b^7$ flanked by flanges $b^8$, $b^9$, the latter flange being deeper or more extended than the former flange. Said packing ring $b^4$ is provided on its upper surface with an annular channel $b^{10}$, flanked by flanges $b^{11}$, $b^{12}$. Within the circle of the flange $b^{12}$, the packing ring $b^4$ is channeled or recessed as indicated at $b^{13}$ to receive the outer margins of the screens $b$, $b^1$, and the ring $b^5$.

The ring $b^5$ is provided on its upper surface with an annular recess $b^{14}$ which is flanked on one side by the flange $b^{12}$ of the ring $b^4$ and on the other side by a flange $b^{15}$ which is higher than the flanges $b^{11}$, $b^{12}$.

Each complete distributer-element comprises a radially corrugated perforate annular disk $b^{16}$ equipped at its inner margin with a conduit-section $b^{17}$ and at its outer margin with a packing ring $b^{18}$; and a perforate annular disk or screen $b^{19}$ equipped at its outer periphery with a packing ring $b^{20}$. The packing ring $b^{18}$ is provided on its upper surface with an annular recess $b^{21}$ flanked by flanges $b^{22}$, $b^{23}$, the flange $b^{23}$ being higher than the flange $b^{22}$. The conduit-section $b^{17}$ comprises a tubular member equipped externally between its ends with a flange $b^{24}$ which constitutes a packing ring, being provided on its lower surface with an annular recess $b^{25}$ which lies between a flange $b^{26}$ and the lower portion of the tubular member. The upper surface of the flange $b^{24}$ is flat to receive the uncorrugated inner margin of the disk $b^{16}$. Slipped over the upper end of the conduit section $b^{17}$ is a packing ring $b^{27}$ having on its upper surface an annular recess $b^{28}$ located between a flange $b^{29}$ and the upper portion of the conduit section. The packing ring $b^{18}$ is cut away at its lower side to receive the outer peripheral portion of the corrugated disk $b^{16}$. Said ring is thus formed with a depending flange at its outer portion, and said flange is provided with radial channels $b^{30}$ through which access to the distributer-element is had. The packing ring $b^{20}$ is recessed upon its upper surface to receive the outer peripheral margin of the perforate disk or screen $b^{19}$, and is provided on its lower surface with an annular recess $b^{31}$ flanked by flanges $b^{32}$, $b^{33}$, the flange $b^{33}$ being smaller or of less depth than the flange $b^{32}$.

It will be understood that in practice more cells are commonly employed in a filter than are illustrated in the drawing. At the bottom of the filter-casing, it is unnecessary to employ a complete distributer, such as is required in the intermediate portion of the filter. Accordingly, the corrugated perforate disk $b^{16}$ is employed at the bottom of the filter. At the top of the filter, there is employed an imperforate radially corrugated disk $c$ equipped at its central portion with a conduit-section $c^1$ which forms a cap for the sectional conduit $B^3$ and is equipped with an external recessed flange $c^2$ forming a packing ring. Beneath the corrugated disk $c$ is placed one of the perforated disks or screens $b^{19}$ whose outer periphery is equipped with a packing ring as shown.

In assembling the parts, the distributer and collector-elements are arranged in the order indicated, and an adequate amount of filter-material is placed between said elements and between the packing rings with which said elements are equipped. When the ends of the casing are screwed down, the filter-material is compressed to the required density for filtration purposes between the distributer and collector-elements, and between the packing rings the material is so tightly compacted as to be practically impervious to liquor. When the filter is thus assembled, there remains an annular space $d$ between the inner surface of the cylindrical portion of the casing and the filter-cells, through which the liquor has access to the distributer-elements. The chief purpose of the present invention is to prevent the liquor from seeping along the surfaces of the outer packing rings and finding a short-cut to the collector-elements and thence to the central conduit. The annular flange $b^{12}$ of the packing ring $b^4$ serves this purpose, since said flange prevents the liquor from finding its way into the joint $f$, between the packing ring $b^4$ and the packing ring $b^5$ and thence through the collector-element to the central conduit. It will be noted that the flanges $b^{23}$ and $b^{32}$ of the outer packing rings of the collector-elements are staggered with relation to the flanges $b^9$ and $b^{15}$ of the outer packing rings of the collector-elements. This feature is of benefit also in maintaining tight joints, since a tighter packing of the filter-material at the outer packing rings is thereby accomplished.

It will be understood that the central conduit sections forming the sectional conduit $B^3$ telescope with each other in a manner now well understood.

The present invention constitutes an improvement upon the filter shown in Patent No. 849,017 granted April 2, 1907.

What I regard as new, and desire to secure by Letters Patent, is—

1. In a filter, the combination of a casing provided with an inlet and having a central outlet, and filter-cells within the casing and forming therewith an annular chamber, the filter-cells being constructed with telescoping central conduit sections and distributer and collector-elements equipped at their external peripheries with packing rings, the packing rings of the distributer-elements and the collector-elements having annular flanges staggered with relation to each other, and filter-masses extending between and compacted between said packing rings, for the purpose set forth.

2. In a filter the combination of a casing provided with an inlet and having a central outlet and filter-cells within the casing and forming therewith an annular chamber, the filter-cells being constructed with telescoping central conduit sections and alternating distributer and collector-elements, each collector-element comprising a pair of annular screens, one of which screens is equipped at its outer periphery with a packing ring having one surface provided with two annular flanges and having a recess adjacent to the inner one of said flanges, and the other of said screens having its outer periphery equipped with a packing ring member fitting within said recess and equipped with a flange, and each distributer-element being equipped at its outer periphery with a packing ring, and filter-masses extending between and compacted between said packing rings, for the purpose set forth.

3. In a filter, the combination of a casing provided with an inlet and having a central outlet, and filter-cells within the casing and forming therewith an annular chamber, the filter-cells being constructed with telescoping central conduit-sections and distributer and collector-elements equipped at their external peripheries with packing rings, the packing ring of each collector-element comprising an annular member $b^4$ having an annular recess $b^7$ on one surface and an annular recess $b^{10}$ on the other surface and having also a cut-away portion or recess adjacent to the inner flange flanking the recess $b^{10}$, an annular member $b^5$ fitting within said last-named recess and equipped with a flange $b^{15}$, and the distributer-elements having at their outer peripheries packing rings with flanges staggered with relation to the inner flanges of the packing rings of the collector-elements, and filter-masses extending between and compacted between said packing rings, for the purpose set forth.

JOHN T. H. PAUL.

In the presence of—
D. CINCOTTA,
M. GETZ.